United States Patent Office 3,192,255
Patented June 29, 1965

3,192,255
STABILIZATION OF PERACETIC ACID WITH QUINALDIC ACID
Allan Brooks Cann, Shawinigan South, Quebec, Canada, assignor to Shawinigan Chemicals Limited, Montreal, Quebec, Canada, a corporation of Canada
No Drawing. Filed Jan. 18, 1960, Ser. No. 2,842
3 Claims. (Cl. 260—502)

This invention relates to the stabiliaztion of peracids. More particularly, it relates to the stabilization of crude solutions of peracetic acid in a non-reactive organic solvent and to the stabilization of refined aqueous solutions of peracetic acid, by the addition of quinaldic acid.

It is generally desirable to stabilize peracetic acid in solution because it is relatively unstable and decomposes at a relatively rapid rate. Dipicolinic acid, for example, is a known stabilizer for peracetic acid aqueous solutions. Solutions of peracetic acid prepared by the air oxidation of acetaldehyde in a non-reactive organic solvent in the presence of a metal compound catalyst are extremely unstable at room temperature or at higher temperatures. If an unstabilized crude soltuion is allowed to come to room temperature, it will start to decompose exothermically and boil rapidly. Thus, the unstabilized crude solution cannot be stored accept at low temperatures; otherwise it must be rectified immediately. Furthermore, the unstabilized peracetic acid contained in the crude solution decomposes while being rectified and may create an explosion hazard. Even known peracid stabilizers such as dipicolinic acid have little or no effect on the stability of such crude solutions.

It is an object of the present invention to provide effective stabilization for peracetic acid so as to facilitate storage or rectification of the crude solution. It is also an object of the present invention to provide effective stabilization for peracetic acid either in a non-reactive organic solvent or in aqueous solution.

It is also an object of the present invention to provide effective stabilization for both crude solutions of peracetic acid containing, for example, acetaldehyde, traces of metal catalyst, or acetic acid, and refined solutions of peracetic acid. Other objects and advantages of the present invention will appear from the description to follow.

The invention broadly consists in a method of stabilizing a carboxylic peracid which comprises incorporating quinaldic acid therein.

The invention also consists in a composition of matter comprising a lower molecular weight carboxylic peracid and a stabilizing amount quinaldic acid.

Peracetic acid can be obtained by air oxidation of acetaldehyde in a non-reactive organic solvent, for example methyl acetate, ethyl acetate, isopropyl acetate, acetone, or acetic acid, in the presence of a cobalt or copper compound catalyst. The crude solutions thus obtained usually contain 6.0–15.0% peracetic acid, 0.7–2.0% unreacted acetaldehyde, 1.0–2.5% acetic acid, 0.005% metal compound catalyst, 0.1–0.5% organic peroxide material, and 80–91% solvent.

It was found that quinaldic acid is exceptionally effective for stabilizing such crude peracid solutions, in contrast to known stabilizers which have very little stabilizing effect on the crude solutions. It was also found that quinaldic acid is very effective for stabilizing peracetic acid in a non-reactive organic solvent or in an aqueous medium from which by-products or impurities have been removed.

The usual stabilizers for hydrogen peroxide are not necessarily effective as stabilizers for peracids. The decomposition of peracids involves a series of decomposition and exchange reactions totally different from the breakdown into oxygen and water which occurs in the decomposition of hydrogen peroxide. In fact, in general, known hydrogen peroxide stabilizers have little or no effect on peracid stabilization as evidenced by sodium stannate, for example. This point is established in U.S. Patents 2,609,391, Greenspan et al., and 2,347,434, Reichert et al. In the present case, the difference is even more accentuated as even known peracid stabilizers are ineffective in stabilizing a crude solution of peracid.

The amount of stabilizer to be added may vary widely, depending on the stability desired in the product and on the magnitude of the factors contributing to the instability of the material. These factors include (a) the natural instability of peracetic acid which decomposes at a uniform rate at a specific temperature in the absence of other factors, (b) the presence of metal ions, (c) the presence of acetaldehyde, and (d) the temperature of the solution. Useful amounts of stabilizer are up to 1000 parts per million of soltuion, by weight. Generally, 250 to 750 parts per million of stabilizer are sufficient to ensure good stability.

EXAMPLES

The following examples, in which p.p.m. denotes parts per million are illustrative of the invention. In these examples, room temperature defines a temperature of 20–25° C., and the percentages given are by weight.

*Example 1*

Three samples of 100 cc. each of a solution of peracetic acid in ethyl acetate were isolated in polyethylene bottles. The peracid solution analyzed 6.3% peracetic acid, 1.4% acetic acid, 0.9% acetaldehyde, 0.1–0.5% organic peroxide, 0.005% $CoCl_2 \cdot 6H_2O$, the balance being ethyl acetate. The samples were treated with 110, 560, and 1,100 p.p.m. quinaldic acid, respectively. The quinaldic acid was added as acetic acid solutions containing 0.02 g. per ml. of stabilizer (prepared by heating the acetic acid to effect solution of the solids). The samples so stabilized were stored at room temperature and periodically analyzed for peracetic acid content with the following results:

| Stabilizer | P.p.m. | Percent Peracid After Elapsed Time | | |
|---|---|---|---|---|
| | | 0 | 20 hrs. | 43 hrs. |
| Quinaldic Acid | 110 | 6.3 | 3.8 | 3.3 |
| | 560 | 6.3 | 4.1 | 3.5 |
| | 1,100 | 6.3 | 4.0 | 3.5 |

*Example 2*

100 cc. of rectified peracetic acid solution were isolated in loosely stoppered polyethylene bottles. The peracid solution analyzed 22.7% peracetic acid, 10.9% acetic acid, less than 1% organic peroxide, the balance being a mixture consisting approximately of 90% methyl acetate and 10% ethyl acetate. 260 p.p.m. of quinaldic acid were added as a solid. A 50 cc. of sample of the same solution was isolated without addition of stabilizer, and retained as reference. The samples were allowed to come to room temperature. Periodic analyses for peracetic acid content, at the times indicated, gave the following results:

| Time (hours) | Percent Peracid in Stabilized Sample | Percent Peracid in Reference Sample |
|---|---|---|
| 19 | 21.9 | 21.4 |
| 43 | 21.2 | 20.4 |
| 96 | 21.0 | 18.5 |
| 164 | 19.8 | 15.7 |
| 212 | 19.5 | 14.6 |
| 428 | 19.5 | [1] 5.2 |
| 528 | 16.9 | |
| 930 | 16.4 | |
| 1,271 | 14.1 | |

[1] This sample was discarded after 428 hours.

The rate of decomposition R, of each sample expressed as percent peracetic acid loss per day can be calculated from the figures given in the preceding table according to the formula:

$$R = \frac{C_1 - C_2}{C_1} \times \frac{100}{T_1 - T_2}$$

in which $C_1$ is the peracid concentration at time $T_1$ and $C_2$, the peracid concentration at time $T_2$. For the period covered by the table, these rates of decomposition are 0.7% peracetic acid loss per day in the case of quinaldic acid, and 4.3% in the case of the unstabilized or reference sample.

*Example 3*

A solution of quinaldic acid in acetic acid containing 0.02 g. per ml. was prepared by adding the required amount of quinaldic acid to moderately warm acetic acid. 1.25 ml. of this solution were added to a 50 ml. sample of a peracetic acid solution which analyzed, after this addition, 33.6% peracetic acid, 1.0% hydrogen peroxide, 14.9% acetic acid, and 50.5% water. The same peracetic acid solution analyzed, before addition of the stabilizer solution, 34.7% peracetic acid, 1.0% hydrogen peroxide, 13.9% acetic acid, and 50.4% water, and had a density of 1.07 g. per ml. at room temperature. A 50 ml. sample of this unstabilized solution was retained as reference. Both samples were contained in loosely stoppered polyethylene bottles and were allowed to come to room temperature. Periodic analyses of these samples for peracetic acid content, at the times indicated gave the following results:

| Time (hours) | Percent Peracid in Stabilized Sample | Percent Peracid in Reference Sample |
|---|---|---|
| 0 | 33.6 | 34.7 |
| 143 | 21.6 | 18.6 |
| 305 | 13.6 | 8.5 |
| 574 | 9.1 | 4.2 |

*Example 4*

Two samples of 40 cc. each of rectified peracetic acid solution in water were isolated in loosely stoppered polyethylene bottles. The solution analyzed 51.2% peracetic acid, 0.2% hydrogen peroxide, and 48.6% water, and has a density of 1.07 g. per ml. at room temperature. Quinaldic acid (0.02 g.) was added as a solid to one of these samples and dissolved by agitation. The other sample was retained as reference sample. Both samples were kept at room temperature. They were periodically analyzed for peracetic acid content at the times indicated in the following table with the following results:

| Time (hours) | Percent Peracid in Stabilized Sample | Percent Peracid in Reference Sample |
|---|---|---|
| 0 | 51.2 | 51.2 |
| 69 | 43.3 | |
| 166 | 30.1 | 21.9 |
| 312 | 16.2 | 8.3 |
| 547 | 8.0 | [1] 2.3 |
| 887 | 5.2 | |

[1] This sample was discarded after 547 hours.

The foregoing examples are given by way of illustration only, and do not limit the scope of the invention. Thus, other peracids, for example perpropionic acid, can be stabilized with quinaldic acid. It is preferred to use quinaldic acid stabilizer as the pure acid. However, salts of quinaldic acid which are derivatives of the acid function and are soluble in the solvent used can also serve as stabilizers.

It will be understood that many other variations of this process may be made without departing from the invention which is as defined in the following claims.

What is claimed is:

1. A composition of matter comprising peracetic acid in at least one solvent selected from the group consisting of acetic acid, methyl acetate, ethyl acetate and water, and a stabilizing amount of quinaldic acid.

2. A process for stabilizing peracetic acid in solution in at least one solvent selected from the group consisting of acetic acid, methyl acetate, ethyl acetate and water, which comprises incorporating therein a stabilizing amount of quinaldic acid.

3. A process for stabilizing crude peracetic acid prepared by oxidation of acetaldehyde with an oxygen-containing gas in at least one organic solvent selected from the group consisting of acetic acid, methyl acetate and ethyl acetate in the presence of a catalyst selected from the group consisting of salts of copper and cobalt, which comprises incorporating therein a stabilizing amount of quinaldic acid.

References Cited by the Examiner
UNITED STATES PATENTS 2,347,434  4/44  Reichert et al.
2,624,655  1/53  Greenspan.

FOREIGN PATENTS 716,077  9/54  Great Britain.
117,580  7/58  Russia.

LORRAINE A. WEINBERGER, *Acting Primary Examiner.*

LEON ZITVER, CHARLES B. PARKER, *Examiners.*